US011582272B1

(12) United States Patent
Gulati et al.

(10) Patent No.: US 11,582,272 B1
(45) Date of Patent: Feb. 14, 2023

(54) WHITEBOARD BACKGROUND CUSTOMIZATION SYSTEM

(71) Applicant: Microsoft Technology Licensing, LLC, Redmond, WA (US)

(72) Inventors: Ankit Gulati, Gurugram (IN); Vaibhav Pachauri, Noida (IN); Ujjaval Kumar Singh, New Delhi (IN); Sampat Khinchi, Nagaur (IN); Deepika Dhupar, New Delhi (IN); Nakul Sabharwal, New Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/557,973

(22) Filed: Dec. 21, 2021

(51) Int. Cl.
*H04N 21/2187* (2011.01)
*H04N 21/854* (2011.01)
*H04N 21/472* (2011.01)
*H04N 21/81* (2011.01)
*H04L 65/401* (2022.01)
*H04L 65/403* (2022.01)
*G06T 5/00* (2006.01)
*G06T 5/50* (2006.01)
(Continued)

(52) U.S. Cl.
CPC .......... *H04L 65/4015* (2013.01); *G06T 5/008* (2013.01); *G06T 5/009* (2013.01); *G06T 5/50* (2013.01); *G06V 10/28* (2022.01); *H04L 65/403* (2013.01); *G06V 2201/09* (2022.01); *G06V 2201/10* (2022.01)

(58) Field of Classification Search
USPC ........................................................ 709/204
See application file for complete search history.

(56) References Cited

U.S. PATENT DOCUMENTS 7,577,905 B2    8/2009   Collins et al.
10,282,075 B2   5/2019   Maloney et al.
(Continued)

OTHER PUBLICATIONS

"Adobe Color", Retrieved from: https://web.archive.org/web/20211124215020/https://color.adobe.com/create/color-wheel/, Nov. 24, 2021, 1 Page.

(Continued)

*Primary Examiner* — Jude Jean Gilles
(74) *Attorney, Agent, or Firm* — Schwegman Lundberg & Woessner, P.A.

(57) ABSTRACT

Systems and methods are directed to automatically creating customized whiteboard backgrounds. A network system accesses metadata associated with a virtual presentation (e.g., title, topic, tenant identifier). First image data is identified based on first data of the metadata and second image data is identified based on second data of the metadata. Using the first image data and the second image data, the network system generates a plurality of whiteboard backgrounds by combining a first object obtained from the first image data with a second object obtained from the second image data to form each whiteboard background. The network system then causes presentation of a representation of each of the plurality of whiteboard backgrounds on a user interface of a host, who can select one of the representations. In response to receiving a selection, a whiteboard background corresponding to the selected representation is displayed as background on a whiteboard canvas.

20 Claims, 10 Drawing Sheets

(51) Int. Cl.
  *G06V 10/28* (2022.01)
  *G09B 5/06* (2006.01)
  *G09B 5/10* (2006.01)

(56) References Cited

U.S. PATENT DOCUMENTS

2017/0039867 A1* 2/2017 Fieldman ............ H04N 21/2187
2019/0325771 A1* 10/2019 Ghatage ................. G09B 5/10

OTHER PUBLICATIONS

"Colormind", Retrieved from: https://web.archive.org/web/20170130124152/http://colormind.io/, Jan. 30, 2017, 5 Pages.

"ColorSpace", Retrieved from: https://web.archive.org/web/20211119140940/https://mycolor.space/, Nov. 19, 2021, 1 Page.

"How to Use Background Subtraction Methods", Retrieved from; https://docs.opencv.org/3.4/d1/dc5/tutorial_background_subtraction.html, Retrieved on: Nov. 18, 2021, 4 Pages.

Mikutel, Ian, "Welcome to the new Whiteboard!", https://techcommunity.microsoft.com/t5/microsoft-365-blog/welcome-to-the-new-whiteboard/ba-p/2779824, Sep. 28, 2021, 29 Pages.

Prabhu, N., et al., "Whiteboard documentation through foreground object detection and stroke classification", In Proceedings of IEEE International Conference on Systems, Man and Cybernetics, Oct. 12, 2008, pp. 336-340.

Bradburn, S., "9 Best Whiteboard Animation Software in 2021 (Free & Paid)", Retrieved from: https://web.archive.org/web/20210416210512/https://sidehustleteach.com/best-whiteboard-animation-software/, Apr. 16, 2021, 30 Pages.

Varshney, Devansh, "Object Detection and Tracking using OpenCV", Retrieved from: https://medium.com/@devanshvarshney/object-detection-and-tracking-using-opencv-4f68aa41dd3a#:~:text=%20Object%20Detection%20and%20Tracking%20using%20OpenCV%20,np.array%20%28%20%5B90%2C%20255%2C%20255%5D%29.%20Defining...%20More%20, Mar. 20, 2019, 14 Pages.

* cited by examiner

WHITEBOARD BACKGROUND CUSTOMIZATION SYSTEM

TECHNICAL FIELD

The subject matter disclosed herein generally relates to virtual presentations. Specifically, the present disclosure addresses systems and methods that automatically creates whiteboard backgrounds that are customized to the virtual presentations.

BACKGROUND

Recently, school classes and meetings have moved into the virtual world. These classes and meeting may use a whiteboard to convey information. Traditionally, whiteboards are plain white canvases. Unfortunately, these whiteboards are not engaging, and an audience may quickly lose interest.

BRIEF DESCRIPTION OF THE DRAWINGS

Some embodiments are illustrated by way of example and not limitation in the figures of the accompanying drawings.

DETAILED DESCRIPTION

Figure 1:
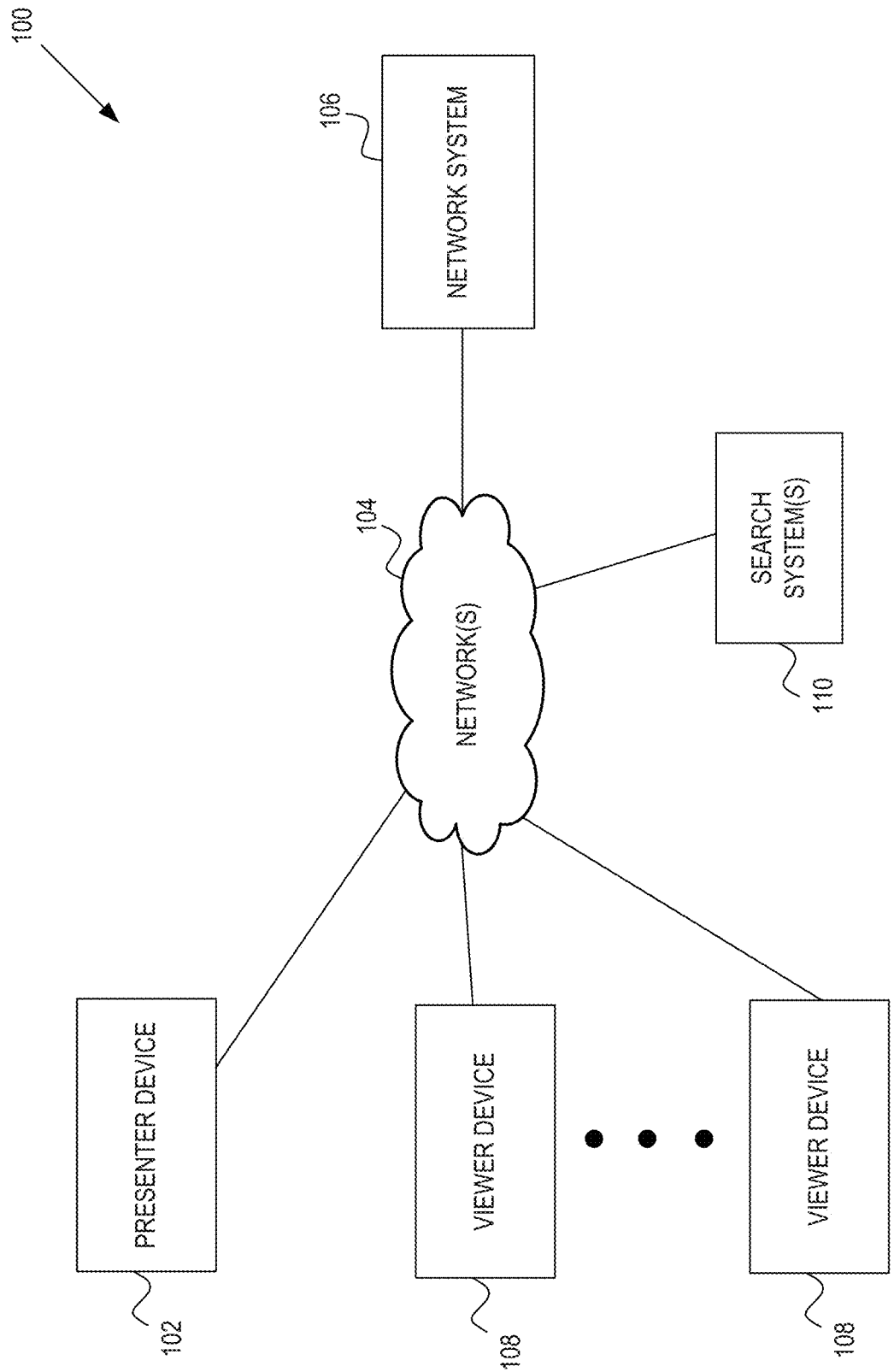
FIG. 1 is a diagram illustrating a network environment suitable for automatically creating whiteboard backgrounds that are customized to a virtual presentation, according to some example embodiments.

The description that follows describes systems, methods, techniques, instruction sequences, and computing machine program products that illustrate example embodiments that facilitate solving the technical problem of automatically creating customized whiteboard backgrounds for virtual presentations. The example embodiments use contextual metadata to search for related image data, identify objects from the related image data, and generate a plurality of customized whiteboard backgrounds by blending one or more objects from the image data with one or more background colors derived from the one or more objects. Thus, example embodiments may obviate a need for certain efforts or computing resources that otherwise would be involved, for example, in processing of user interface inputs and the rendering needed for manual search and selection of a whiteboard background.

In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

With more presentations (e.g., school classes, work meetings) taking place virtually, there is a desire to make these presentations more engaging. Oftentimes, the presentations include use of a whiteboard on which a presenter conveys information. However, traditional whiteboards may not be engaging for users that are accustomed to a digital world and social networking.

Example embodiments provides systems and methods that automatically create whiteboard backgrounds that are customized for each virtual presentation. An example network system has intelligence to understand context of a brand or institution associated with a presenter or host and/or a topic of the virtual presentation. The context may be obtained by accessing metadata associated with the virtual presentation. In one embodiment, the metadata comprises a title or topic associated with the virtual presentation and/or a tenant identifier (e.g., name) associated with a presenter/host of the virtual presentation.

Using the metadata, the network system identifies first image data (e.g., pattern images) based on first data of the metadata (e.g., a title, a topic, industry of tenant, tenant identifier) and second image data (e.g., logo images) based on second data of the metadata (e.g., a tenant identifier). In one embodiment, the network system uses the presenter's tenant and the presentation topic as queries in a search application program interface (API) call to search system(s) which returns image data. Alternatively, the network system can search a curated data store of image data.

The image data is then used to generate the plurality of customized whiteboard backgrounds. Specifically, using the first image data and the second image data, the network system generates a plurality of whiteboard backgrounds by combining a first object (e.g., a pattern) obtained from the first image data with a second object (e.g., a logo) obtained from the second image data to form each whiteboard background. Representations of the plurality of whiteboard backgrounds are then presented on a user interface to the host. A selection of one of the representations causes the corresponding whiteboard background to be displayed as background on a whiteboard canvas of the virtual presentation.

As an example, a presenter is hosting a virtual presentation. When the presenter opens a whiteboard session during the virtual presentation, a blank whiteboard background and a whiteboard background option icon may be displayed. Selecting the whiteboard background option icon causes representations (e.g., thumbnails) of a plurality of customized whiteboard backgrounds to be displayed (e.g., on a sidebar or drop-down window), whereby the plurality of whiteboard backgrounds is customized for the virtual presentation based on, for example, the presenter's tenant, a presentation topic, and/or an industry associated with the presenter's tenant. Once the presenter selects one of the whiteboard backgrounds, the selected whiteboard background is displayed (e.g., as a layer) on a whiteboard canvas. The presenter can then scribble on the whiteboard background, add text or a sticky note, and/or move, pan, or zoom in/out on any content added to the selected whiteboard background.

Thus, one or more of the methodologies described herein facilitate solving the technical problem of automatically creating customized whiteboard backgrounds for virtual presentations. Specifically, example embodiments use contextual metadata to search for related image data, identify objects from the related image data, and generate a plurality of customized whiteboard backgrounds by blending one or more objects from the image data with one or more background colors derived from the one or more objects. As such, the methodologies described herein may obviate a need for certain efforts or computing resources that otherwise would be involved, for example, in processing of user interface inputs and the rendering needed for manual search and selection of a whiteboard background. Examples of such computing resources include processor cycles, network traffic, memory usage, data storage capacity, power consumption, network bandwidth, and cooling capacity.

FIG. 1 is a diagram illustrating a network environment 100 suitable for automatically creating whiteboard backgrounds that are customized to a virtual presentation, in accordance with example embodiments. A presenter device 102 is communicatively coupled, via a network 104, to a network system 106 that manages the automatic creation of customized whiteboard backgrounds. The presenter device 102 is a device of a presenter or host (used interchangeably throughout) who is using one or more presentation applications or platforms provided by, or associated with, the network system 106 to host a virtual presentation with one or more attendees at their respective viewer devices 108. For example, the application/platform can be Microsoft Teams.

The presentation device 102 and the view devices 108 may comprise, but is not limited to, a smartphone, tablet, laptop, multi-processor systems, microprocessor-based or programmable consumer electronics, game consoles, set-top boxes, a server, or any other communication device that can generate presentations and can access the network 104. In some embodiments, the presentation device 102 may make application program interface (API) calls to the network system 106 to access the customized whiteboard backgrounds.

Depending on the form of the presenter device 102 and viewer devices 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The network system 106 manages the automatic creation of the whiteboard backgrounds that are customized to the virtual presentation. The network system 106 may comprise one or more servers (e.g., cloud servers) to perform its operations. In example embodiments, the network system 106 accesses (e.g., via API calls) metadata associated with a virtual presentation. In some cases, the metadata is accessed, via the communication network 104 (e.g., the Internet, wireless network, cellular network, or a Wide Area Network (WAN)) from the presenter device 102. In other cases, the metadata may be accessed from a backend server associated with the network system 106. The network system 106 may access the metadata, for example, upon activation of the virtual presentation or upon activation of a whiteboard session.

The metadata may comprise a presentation title or topic (e.g., road map and planning meeting, budget meeting, chemistry class). In some embodiments, the network system 102 identifies the topic of the virtual presentation from the presentation title. The metadata may also comprise a tenant identifier (e.g., a tenant name). In some embodiments, the tenant identifier is that of the host of the virtual presentation. Additionally or alternatively, the tenant identifier may be that of an attendee/viewer of the virtual presentation. From the tenant identifier, the network system 106 can also identify an industry associated with the tenant identifier. For example, if the host is a professor at Harvard that is conducting a chemistry class, the presentation title may be "chemistry class," the topic may be "chemistry," and the tenant identifier may be "Harvard." Additionally, the network system 106 may identify the industry as "education."

With the metadata, the network system 106 can perform a search for related image data. From the image data, the network system 106 can extract objects (e.g., patterns and logos) that can be used to generate the customized whiteboard background. In some embodiments, the network system 106 makes search API calls to search systems 110 to obtain the related image data. The search systems 110 may be associated with, for example, Bing Image or Google Image. Additionally or alternatively, the network system 106 may search an image library associated with the network system 106. The network system 106 will be discussed in more detail in connection with FIG. 2 below.

In example embodiments, any of the systems, devices, or services (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 or their functions may be combined, or the functions described herein for any single component may be subdivided among multiple components. Additionally, any number of presenter devices 102 and viewer devices 108 may be embodied within the network environment 100. While only a single network system 106 is shown, alternative embodiments contemplate having more than one network system 106 to perform the operations discussed herein (e.g., each localized to a particular region).

Figure 2:
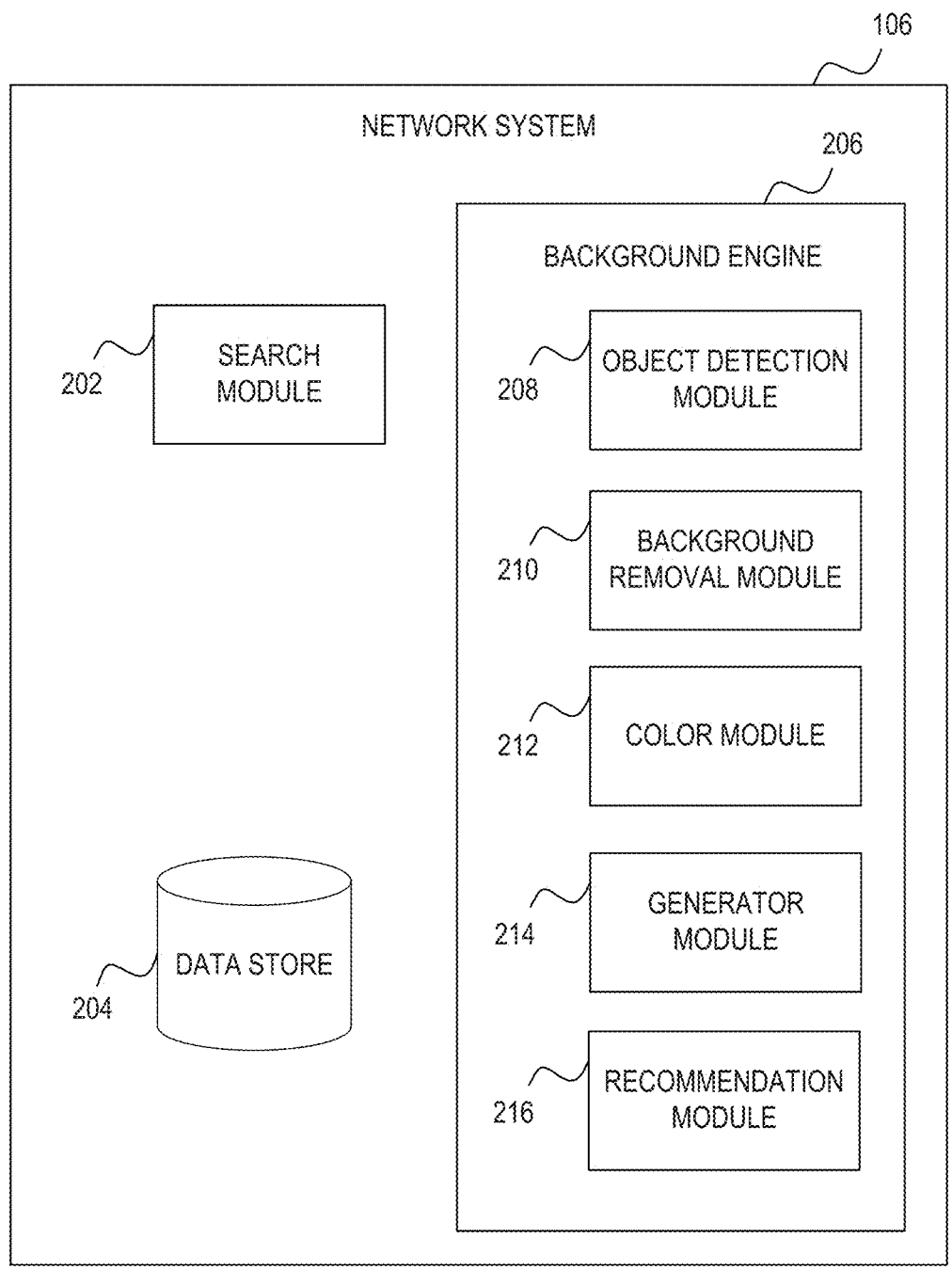
FIG. 2 is a diagram illustrating components of a network system that creates the whiteboard backgrounds that are customized to the virtual presentation, according to some example embodiments.

FIG. 2 is a diagram illustrating components of the network system 106, according to some example embodiments. The network system 106 is configured to automatically create whiteboard backgrounds that are customized to a virtual presentation. To enable these operations, the network system 106 comprises a search module 202, a data storage 204, and a background engine 206 all configured to communicate with each other (e.g., via a bus, shared memory, or a switch). Alternative embodiments may comprise more or less components, combine the functions of some these components into a single component, or making some components optional.

Upon activation of a whiteboard session at the presenter device 102, the network system 106 receives a notification of the activation. For example, the network system 106 receives an API call from the presenter device 102. The notification can include, or trigger the network system 106 to access, metadata associated with a virtual presentation involving the whiteboard session. The metadata can include a presentation title, topic, and one or more tenant identifiers. The tenant identifier can be that associated with the host of the virtual presentation or associated with an attendee. An industry can also be obtained or derived from the tenant identifier, while a topic can be identified from the title.

Using the metadata as contextual query terms, the search module 202 searches for related image data. In some embodiments, the search module 202 makes search API calls to the search systems 110. Additionally or alternatively, the search module 202 can search a data store 204. The data store 204 may comprise a collection of image data curated for specific tenants and/or topics. For example, an individual associated with a tenant (e.g., a tenant admin) may provide preferred logos or pattern images for storage in the data store 204. In some embodiments, frequently used logos or pattern images for a particular tenant may be saved, by the network system 106, to the data store 204. The data store 204 may also include primary background colors and schemes for particular tenants.

The results of the searches comprise image data. In example embodiments, first image data (e.g., pattern images) is obtained based on any combination of the topic (or title) of the presentation, tenant, and/or an industry associated with the tenant of the host (e.g., first data of the metadata) being used as context for the searches. The first image data comprises one or more images that each includes an object (e.g., a pattern) that can be used for "tiling" the whiteboard background (e.g., repeatedly positioned on the whiteboard background).

Additionally, the search may identify second image data (e.g., logo images) using the tenant identifier as context for performing the search. The second image data may be one or more logo images that each includes a logo associated with the tenant identifier (e.g., second data of the metadata). The logo may be positioned, for example, in a single location on the whiteboard background.

In various embodiments, the search results may be ranked. For example, only a top number (e.g., top five) of the most popular or most relevant results are returned to the search module 202. Relevancy and popularity may be based on number of views and/or number of downloads, for example.

The background engine 206 manages the generation of the customized whiteboard backgrounds. In example embodiments, the image data accessed (e.g., received, retrieved) by the search module 202 is provided to the background engine 206. Using the image data, components of the background engine 206 generate the customized whiteboard backgrounds for the virtual presentation. The components of the background engine 206 can include an object detection module 208, a background removal module 210, a color module 212, a generator module 214, and a recommendation module 216.

The object detection module 208 is configured to detect or identify individual objects from the image data. The individual objects can be one or more patterns from first image data (referred to as "first object") or one or more logos from second image data (referred to as "second object"). In one embodiment, the object detection module 208 uses OpenCV to perform the object detection.

Once each object is detected, a background removal module 210 is triggered to remove the background from the objects. For example, the background removal module 210 can remove the background from a pattern detected from the first image data. Similarly, the background removal module 210 can remove the background from a logo detected from the second image data. In one embodiment, the background removal module 210 uses Open CV to perform the background removal.

The color module 212 is configured to manage colors and opacity in generating the whiteboard background. In some embodiments, the color module 212 identifies a dominant color from the first image data (e.g., the pattern image) or first object of the first image data (e.g., a pattern). In some embodiments, the color module 212 identifies a dominant color from the second image data (e.g., the logo image) or the second object of the second image data (e.g., a logo). In example embodiments, the dominant color can be computed using a histogram or bincount technique.

Based on the dominant color, the color module 212 then generates a color palette that comprises a set of colors that match (e.g., is compatible with) the dominant color. The color palette can be generated using various tools such as, for example, Adobe Color, Colormind, or ColorSpace. Because, the first object and/or the second object should be blended onto a background, the background should have a color that is compatible with the first image and/or the second image. Thus, the color module 212 may create one or more variations, based on the color palette, as background colors.

The generator module 214 is configured to create each of the customized whiteboard backgrounds using the identified objects (e.g., patterns, logos) and background colors. In example embodiments, the generator module 214 selects one of the first objects (e.g., a pattern) and tiles the first object on a corresponding background color with some opacity so that any content added to the whiteboard canvas will not be hidden. That is, only a hint of the first object is visible on the whiteboard background. The generator module 214 also selects one of the second objects (e.g., a logo) and positions the second object in one of the corners of the whiteboard background. The first object and the second object may not be related to each other. Instead, it is more important that the first object and/or the second object be compatible with the background color.

In some embodiments, the background engine 206 learns from user behavior to provide recommendations for whiteboard backgrounds. In these embodiments, the recommendation module 216 trains on input data including usage trends of the user, of other users from a same department (e.g., finance may like subtle colors while marketing may like bolder colors), of users in a same tenant, and/or of users in a same industry. Based on the training, the recommendation module 216 can assist the generator module 214 in generating whiteboard backgrounds which will be more likely to be selected by the user. For example, the recommendation module 216 may prioritize one or more background colors, logo images, logo colors, pattern objects, pattern images, or any combination of these for use by the generator module 214 in generating the whiteboard background.

Additionally or alternatively, the recommendation module 216 can recommend one or more whiteboard backgrounds generated by the generator module 214. The recommended whiteboard background(s) can be presented first in a sidebar of the user interface or otherwise visually distinguished from other whiteboard backgrounds that are being recommended by the recommendation module 216.

Figure 3:
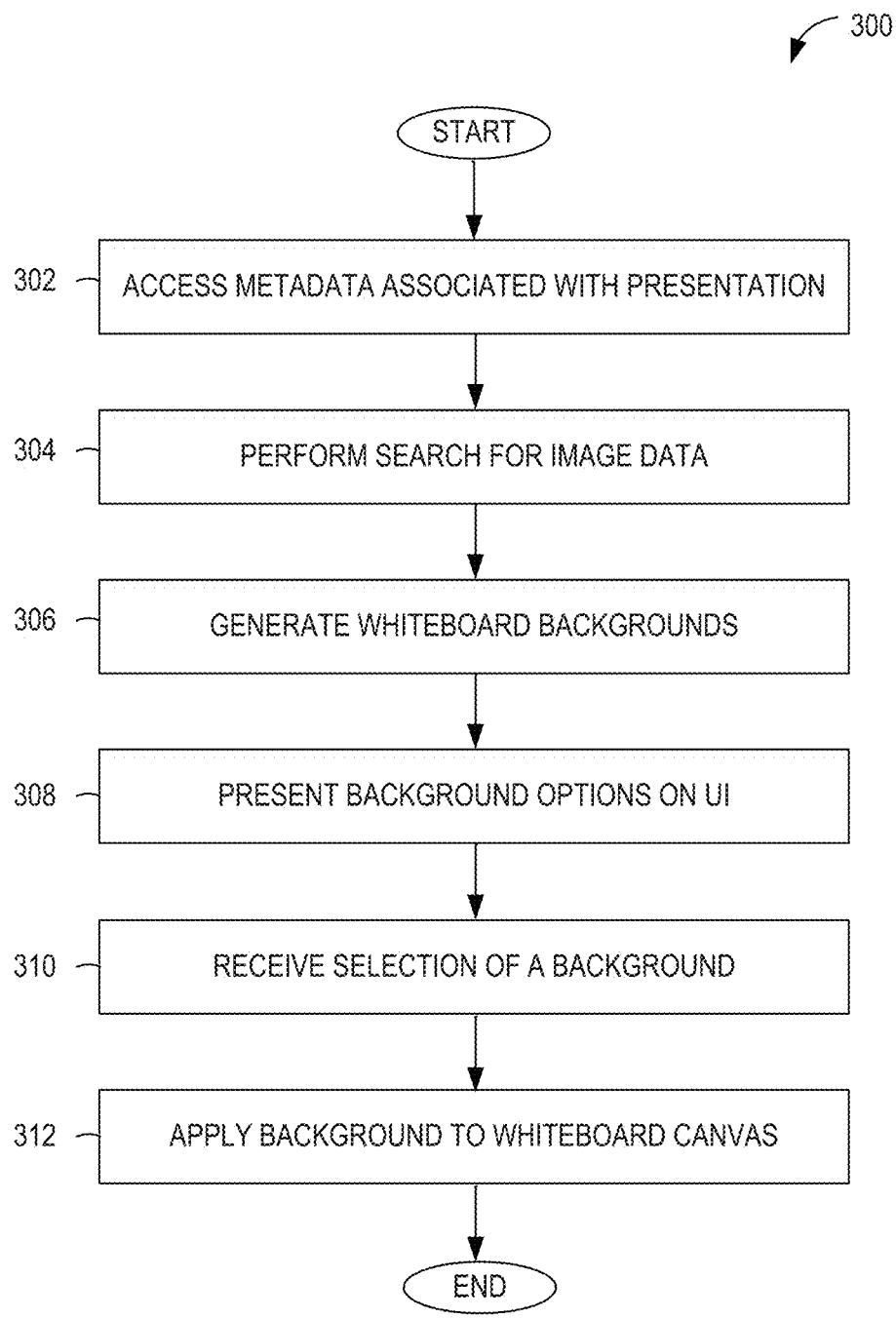
FIG. 3 is a flowchart illustrating operations of a method for creating and presenting whiteboard backgrounds that are customized to the virtual presentation, according to some example embodiments.

FIG. 3 is a flowchart illustrating operations of a method 300 for creating and presenting whiteboard backgrounds that are customized to the virtual presentation, according to some example embodiments. Operations in the method 300 may be performed by the network system 106 described above with respect to FIG. 1 and FIG. 2. Accordingly, the method 300 is described by way of example with reference to these components in the network system 106. However, it shall be appreciated that at least some of the operations of the method 300 may be deployed on various other hardware configurations or be performed by similar components residing elsewhere in the network system 106. Therefore, the method 300 is not intended to be limited to these components.

In operation 302, the network system 106 accesses metadata associated with a virtual presentation. The metadata may be accessed, via the communication network 104 from the presenter device 102 and/or may be accessed from a backend server associated with the network system 106. The metadata can be accessed, for example, upon activation of the virtual presentation or upon activation of a whiteboard session. The metadata may include a presentation title and tenant identifier (e.g., a tenant name) associated with the host and/or attendees. Other metadata can be accessed (or derived from accessed metadata) including topic and industry of the tenant. Additionally, metadata such as time of day, date (e.g., holiday), or any other information which may provide context for determining the image data can be accessed and subsequently used for searching.

In operation 304, the network system 106 performs one or more searches for image data based on the metadata. For example, using the metadata as contextual query terms, the search module 202 searches for related image data. In some embodiments, the search module 202 makes search API calls to the search systems 110. Additionally or alternatively, the search module 202 can search an image library (e.g., stored in data store 204).

The results of the search(es) are image data. First image data (e.g., pattern images) may be obtained based on the topic (or title) of the presentation, tenant, and/or an industry associated with the tenant of the host (e.g., first data of the metadata). The first image data may comprise one or more images that each includes an object (e.g., a pattern) that can be used for "tiling" the whiteboard background (e.g., repeatedly positioned on the whiteboard background). Additionally, second image data may be obtained using the tenant identifier as context for searching. The second image data may comprise one or more images that each includes an object (e.g., a logo) associated with the tenant identifier (e.g., second data of the metadata).

In operation 306, the network system 106 generates the whiteboard backgrounds using the image data. Operation 306 will be discussed in more detail in connection with FIG. 4 below.

In operation 308, the network system 106 (e.g., the generator module 214) presents the customized whiteboard backgrounds as options on a user interface on the presenter device 102. For example, representations of the plurality of whiteboard backgrounds (e.g., thumbnails) can be shown in a sidebar of the user interface. The user (e.g., host or presenter) can scroll through the representations, view any of the customized whiteboard backgrounds in a preview mode, and select one of the customized whiteboard backgrounds for use. Example user interfaces are shown in FIG. 5A-FIG. 5I.

In operation 310, the network system 106 receives a selection of one of the whiteboard backgrounds. In response, the selected whiteboard background is applied to the whiteboard canvas in operation 312. The whiteboard background may comprise a first layer on the whiteboard canvas with a second (or additional) layers providing user-generated content that is added during the whiteboarding session.

Figure 4:
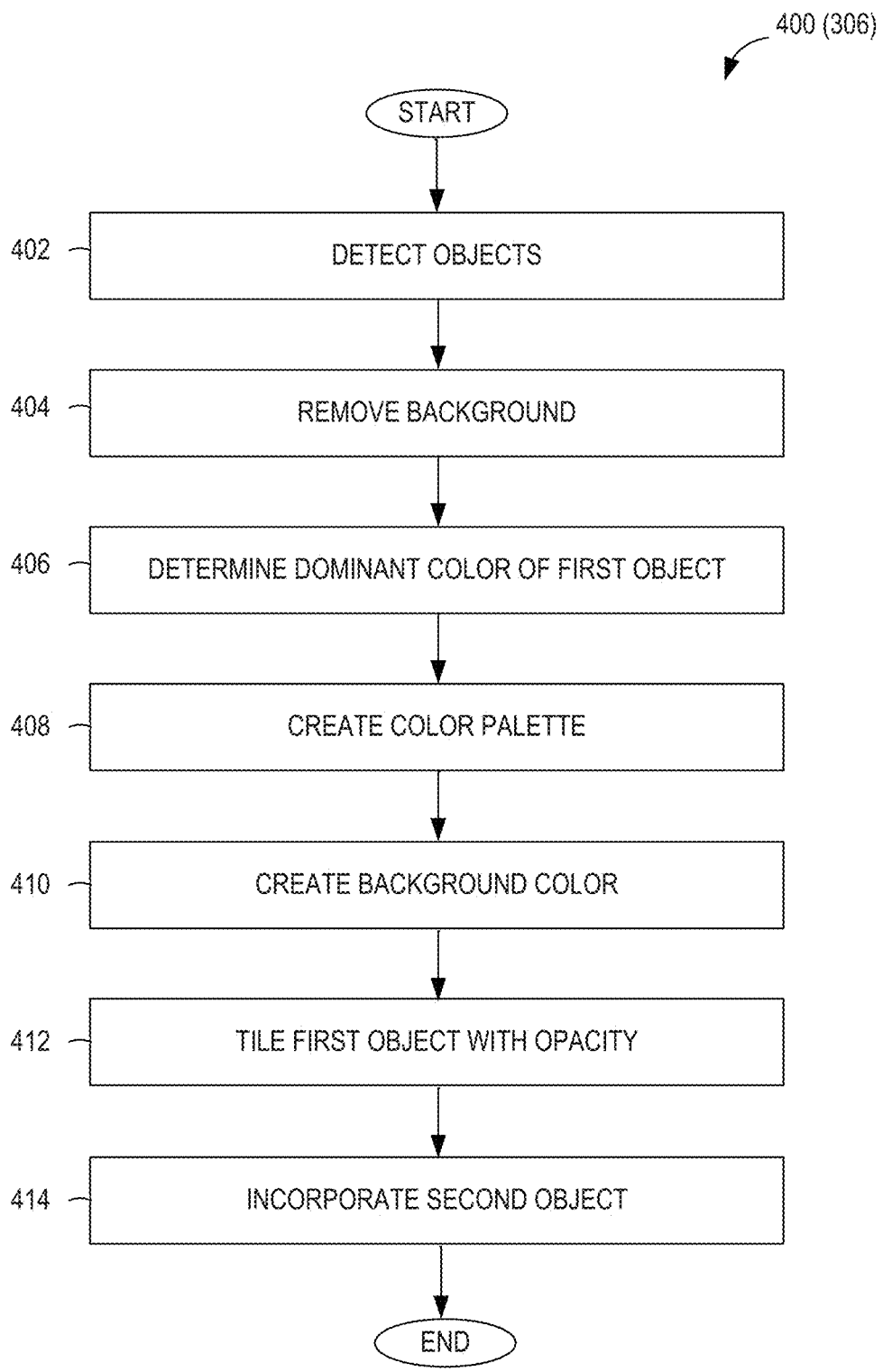
FIG. 4 is a flowchart illustrating operations of a method for generating a customized whiteboard background, according to some example embodiments.

FIG. 4 is a flowchart illustrating operations of a method 400 (operation 306) for generating a customized whiteboard background, according to some example embodiments. Operations in the method 400 may be performed by the network system 106 described above with respect to FIG. 1 and FIG. 2. Accordingly, the method 400 is described by way of example with reference to these components in the network system 106. However, it shall be appreciated that at least some of the operations of the method 400 may be deployed on various other hardware configurations or be performed by similar components residing elsewhere in the network system 106. Therefore, the method 400 is not intended to be limited to these components.

In operation 402, the object detection module 208 detects single objects in the image data. For example, the single object can be a first object (e.g., a pattern) from first image data or a second object (e.g., logo) from second image data. In one embodiment, the object detection module 208 uses Open CV to perform the object detection, however, other known techniques can be used to detect objects in image data.

In operation 404, the background removal module 210 removes background from the detected objects. For example, the background removal module 210 can remove the background from the first image data to first obtain the object (e.g., a pattern). Similarly, the background removal module 210 can remove the background from the second image data to obtain a second object (e.g., a logo). In one embodiment, the background removal module 210 uses Open CV to perform the background removal, however, other known techniques can be used to remove the background from image data.

In operation 406, the color module 212 determines a dominant color for the first object (or first image data containing the first object) and/or the second object (or second image data containing the second object). In some embodiments, the dominant color can be computed using a histogram or bincount technique.

In operation 408, the color module 212 creates a color palette based on the dominant color determined in operation 406. The color palette comprises a set of colors that match (or is comparable to) the dominant color. The color palette can be generated using various tools such as, for example, Adobe Color, Colormind, or ColorSpace.

In operation 410, the color module 212 creates a background color that is comparable with the first object and/or the second object. As such, the color module 212 creates one or more color variations based on the color palette that can be the background color(s).

It is noted that operations 402 through 410 can be repeated based on the amount of first image data and second image data. For example, if five pattern images (first image data) are obtained from the search, then these operations may be performed five times to detect the pattern, remove the background, determine a dominant color, create a color palette, and create a background color for each pattern in the pattern images. Similarly, if five logo images (e.g., second image data) are obtained from the search, operations 402 and 404 may be performed five times to detect the logo in each logo image and remove the respective backgrounds.

In operation 412, the generator module 214 tiles the first object with opacity. In example embodiments, the generator module 214 selects one of the first objects (e.g., a pattern) and tiles the first object on a corresponding background color (from operation 410) with some opacity so that any content added to the whiteboard canvas will not be hidden. Tiling comprises positioning copies of the first object repeatedly across the whiteboard background. As a result of the opacity, only a hint of the tiled pattern is visible on the whiteboard background.

While operation 412 performs tiling of the first object across the whiteboard background, alternative embodiments may use the first object in a different manner or not use the first object. For example, a single version of the first object any be magnified and positioned centered on the whiteboard background (e.g., using only a single tile). Alternatively, operation 412 may be optional or not performed and the whiteboard background may simply be a colored background (e.g., from operation 410) combined with the second object (e.g., a logo). In yet another alternative, the first object may be the same as the second object or the second object is used to tile the whiteboard background.

In operation 414, the generator module 214 incorporates the second object (e.g., a logo) on the whiteboard background. In example embodiments, the generator module 214 selects one of the second objects (e.g., a logo) and positions the second object in one of the corners of the whiteboard background that may now be tiled with the first object. In some embodiments, a second object may not be included in the whiteboard background. In these embodiments, operation 414 is optional or not needed.

The network system 106 may generate a plurality of customized whiteboard backgrounds using different combinations of first objects and second objects blended with a compatible background color. In some cases, the first object and the second objects may be randomly paired (e.g., select the most popular first object and combine with the most popular second object). In other cases, the network system 106 may select a second object that has a similar color scheme (e.g., has a compatible color palette) as the first object and/or the background color. Further still, some cases may allow the user (e.g., host, admin) to select the first object, the second object, and/or the background color. Any technique may be used to select and combine the first object, second object, and background color in various embodiments.

While example embodiments discuss generating the customized whiteboard backgrounds based on a tenant identifier of the host or presenter, alternative embodiments can customize whiteboard backgrounds based on a tenant identifier and/or group identifier of attendees or a group of attendees. For example, if the attendees are from a particular department, such as a marketing department or finance department (e.g., group identifier), the whiteboard background can be customized based on the group identifier. In another example, the group identifier may be an age group, a location group (e.g., based on location of attendees), or other groupings that can be based on discernable attributes. In various embodiments, the group identifier may be metadata obtained from user profiles of the attendees. In one embodiment, the customized whiteboard backgrounds based on attendees' attributes (e.g., attendee tenant identifier) may cause a change in the second image (e.g., the logo) with the rest of the whiteboard background remaining the same for all attendees and the host regardless of their tenant identifier.

In yet a further embodiment, a second layer of the whiteboard background may be positioned between the first layer of the whiteboard background (e.g., the colored background with the tiled first object and the positioned second object) and a content layer (e.g., layer where user-generated content is added). The second layer of the whiteboard background may comprise a further image that is related to the context of the virtual presentation. For example, if the virtual presentation is a budgeting meeting, that information can be used to select a further image, such as a checklist (or template) of items that should be covered in a budgeting meeting. This further image of the second layer may be positioned in a portion of the whiteboard background that will not likely conflict with user-generated content (e.g., on one side of the whiteboard background). In some cases, a notification (e.g., a popup) can ask the host if the checklist/template is desired prior to adding the second layer of the whiteboard background.

Figure 5A:
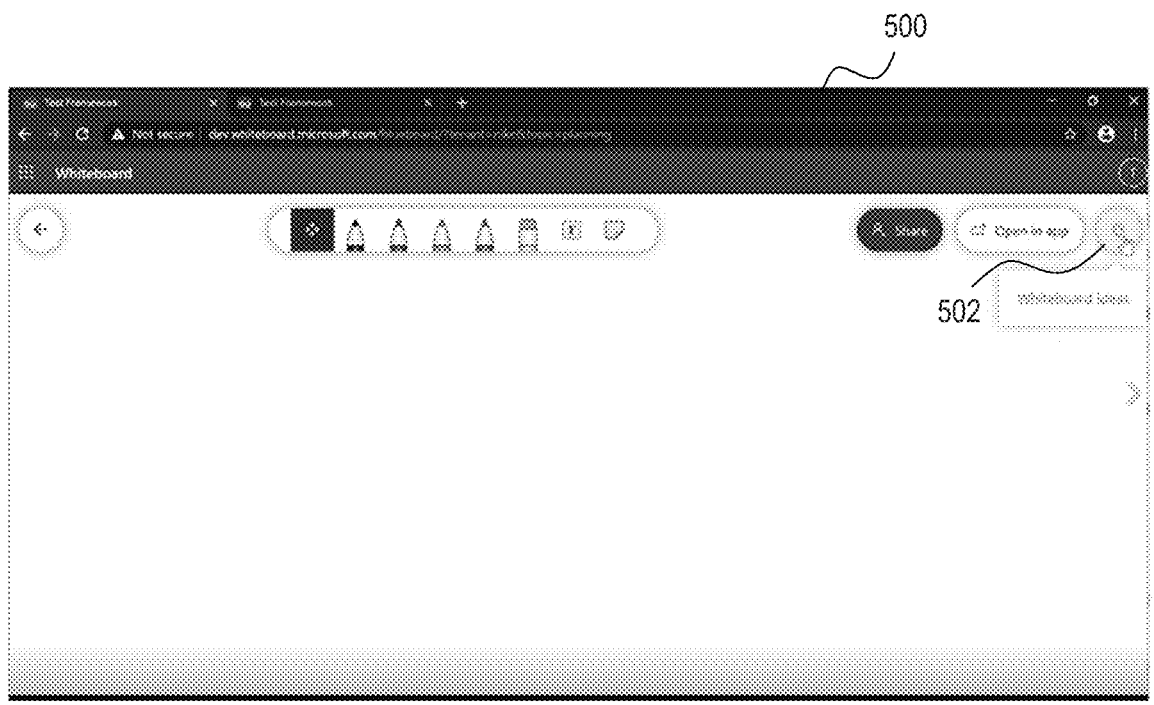
FIG. 5A-FIG. 5I are example screenshots of user interfaces illustrating the display of customized whiteboard backgrounds, according to some example embodiments.

FIG. 5A is an example screenshot of a user interface 500 that is initially shown upon triggering a display of a whiteboard canvas (e.g., starting a whiteboarding session). The user interface 500 includes a blank background and a whiteboard background option icon 502. Selecting the whiteboard background option icon 502 causes representations of a plurality of customized whiteboard backgrounds to be displayed. When the whiteboard session is activated, the network system 106 generates the plurality of customized whiteboard backgrounds as discussed above with respect to FIG. 3 and FIG. 4.

Figure 5B:
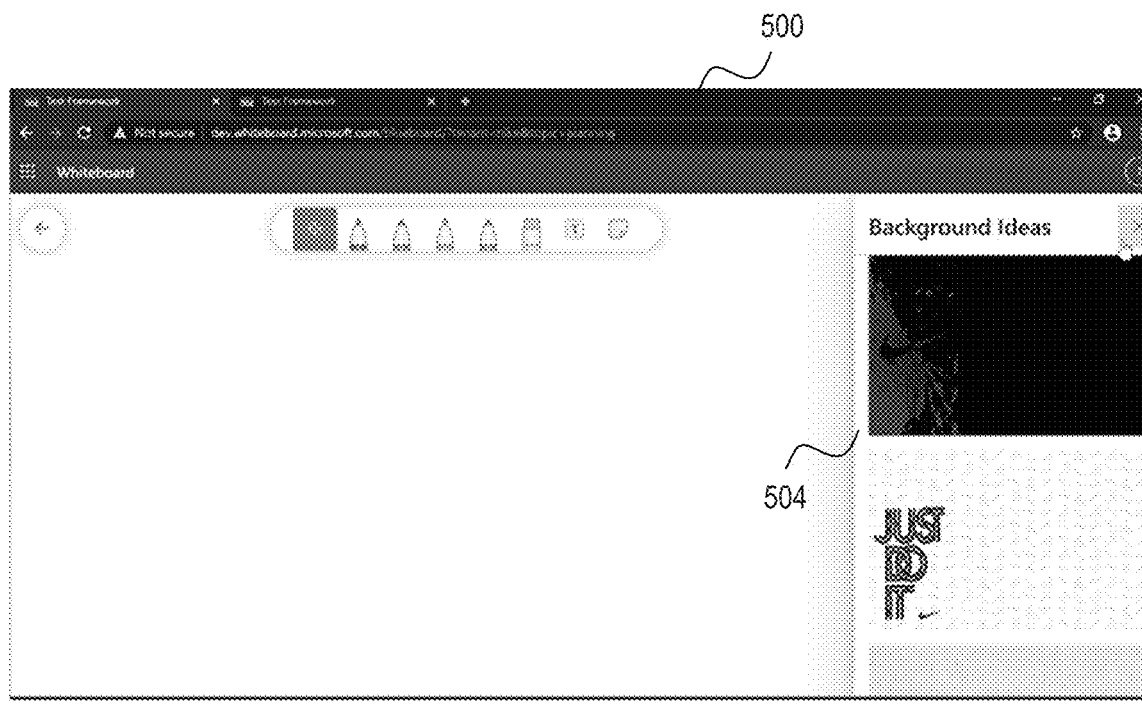

FIG. 5B is an example screenshot of the user interface 500 after the whiteboard background option icon 502 has been selected. As shown, representations of the plurality of customized whiteboard backgrounds are shown in a sidebar 504 of the user interface 500. Alternative embodiments may show the representations in a different format or location on the user interface 500 (e.g., a grid format, in a popup window).

Figure 5C:
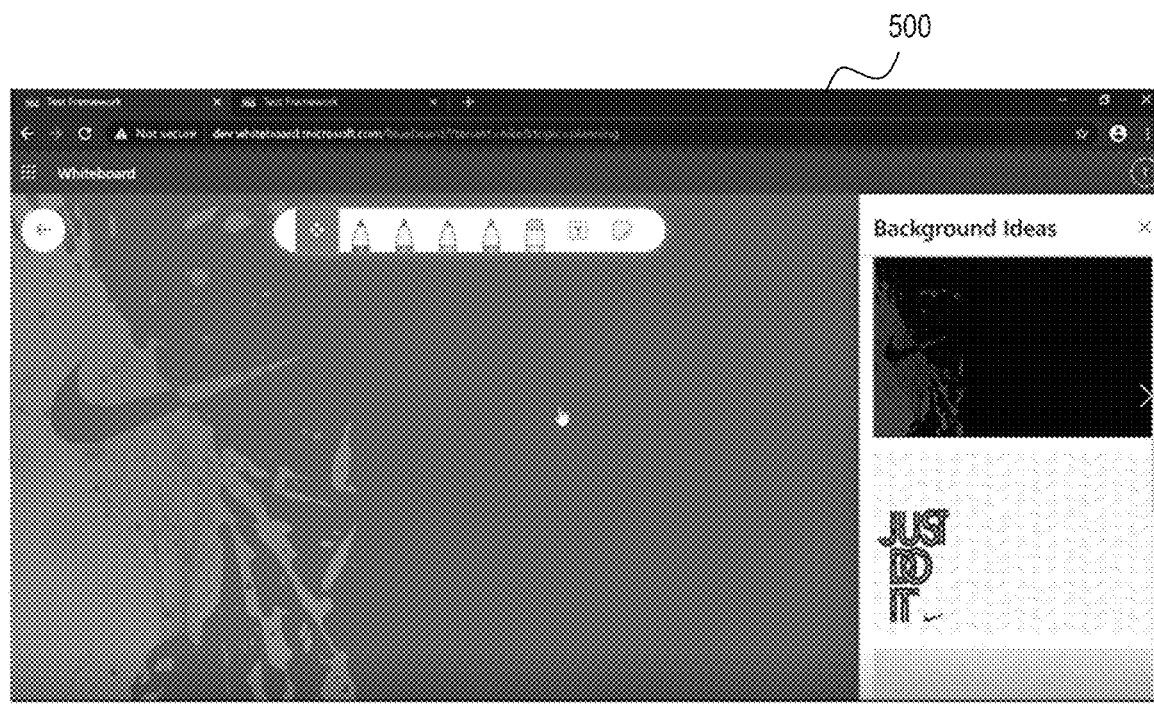

FIG. 5C is an example screenshot of the user interface 500 upon selection of one of the representations. As shown, the selected whiteboard background is displayed in a preview mode on a whiteboard canvas. The preview mode shows the selected whiteboard background visually distinguished (e.g., in a lighter color format).

Figure 5D:
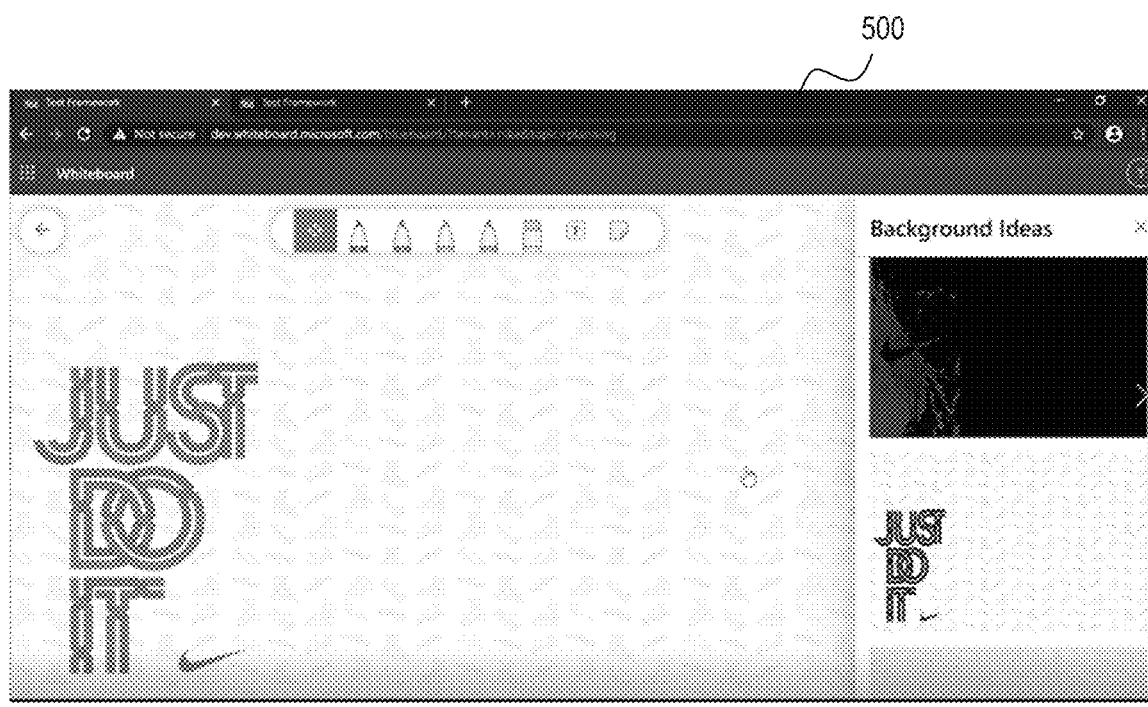

FIG. 5D is an example screenshot of the user interface 500 whereby a next representation is selected. When the next representation is selected, the previously selected whiteboard background in FIG. 5C is replaced with a whiteboard background in a preview mode that corresponds to the next selected representation. Here, the whiteboard background comprises a first object (e.g., pattern) that is different shoes, which is tiled across the whiteboard background. The second object (e.g., a logo of "Just Do It"), is positioned in one corner (or side) of the whiteboard background.

Figure 5E:
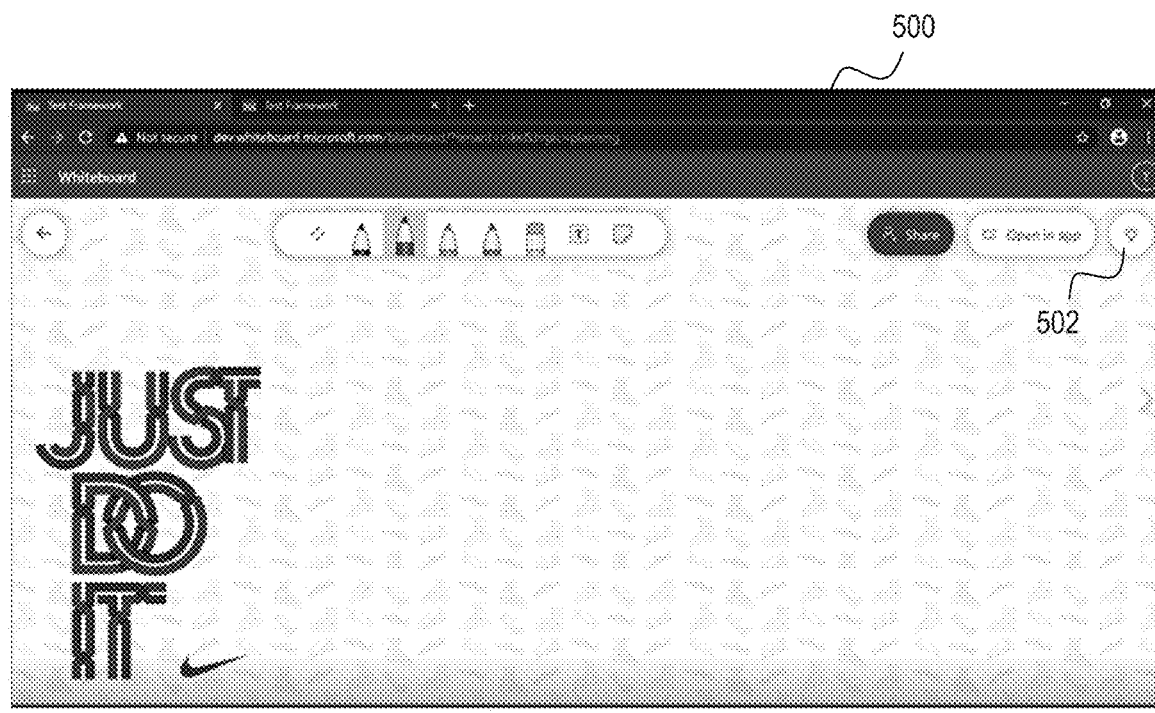

FIG. 5E is an example screenshot of the user interface 500 with the whiteboard background of FIG. 5D confirmed as the whiteboard background to be used in the whiteboard session. In one embodiment, the host can confirm the whiteboard background by clicking on the whiteboard background while it is displayed in the preview mode. However, other methods of confirming the whiteboard background can be used. This causes the whiteboard background to transition from the preview mode to a confirmed mode (e.g., full color format). Additionally, the representations of the plurality of customized whiteboard backgrounds are no longer shown once the whiteboard background is confirmed. The host can, however, select the whiteboard background option icon 502 at any time to view the representations of the customized whiteboard backgrounds and change the whiteboard background.

Figure 5F:
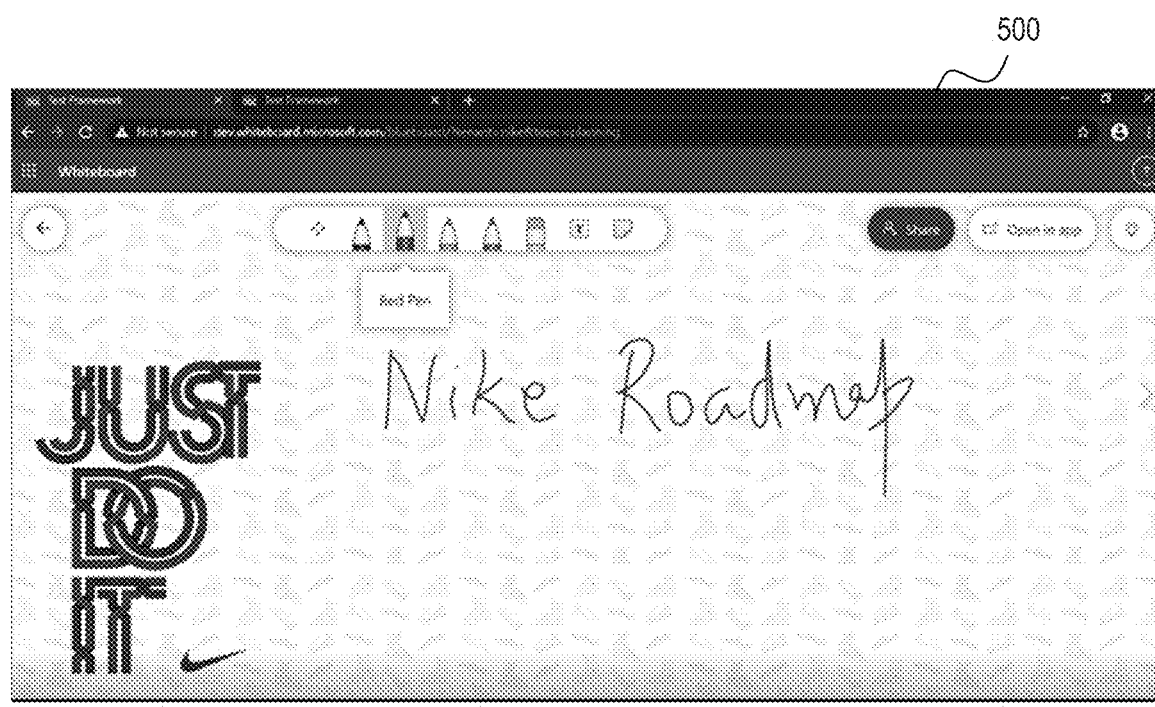

FIG. 5F is an example screenshot of the user interface 500 with user-generated content (e.g., "Nike Roadmap) added to the whiteboard canvas. For example, the host may add the content by using a virtual pen to draw on the whiteboard canvas.

Figure 5G:
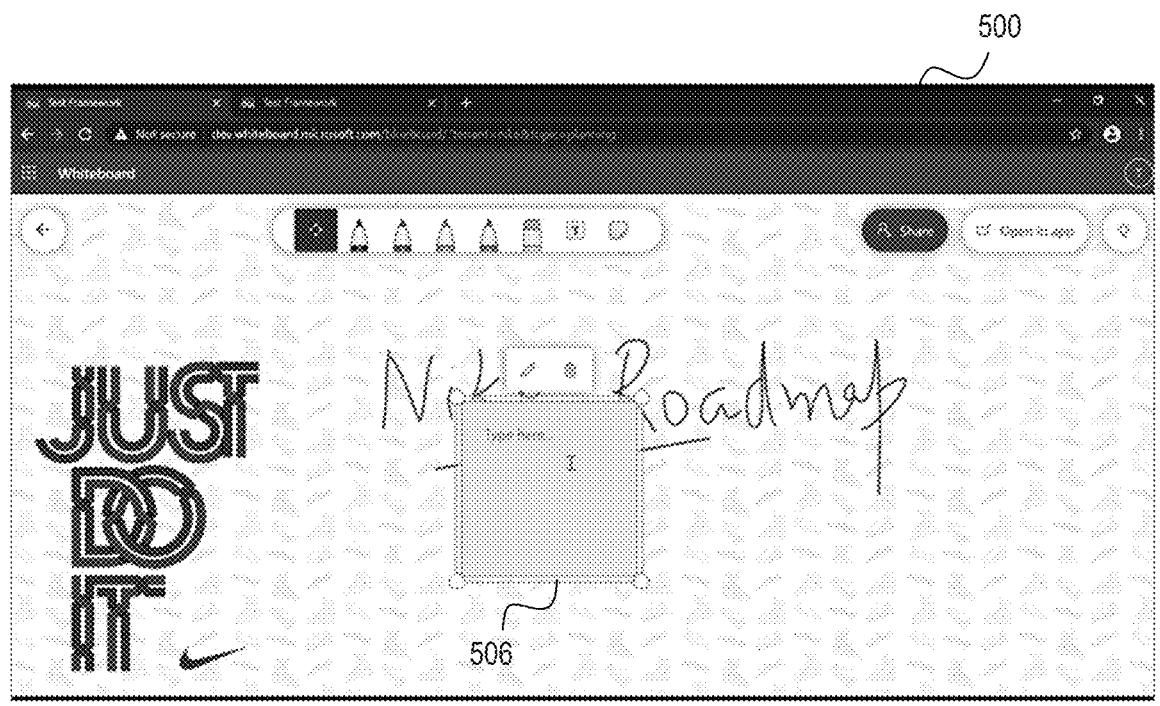
Figure 5H:

FIG. 5G is an example screenshot of the user interface 500 with a sticky note 506 placed on the whiteboard canvas. The host can then type content in the sticky note 506. The host can also move the sticky note 506 around the whiteboard canvas as shown in FIG. 5H.

Figure 5I:
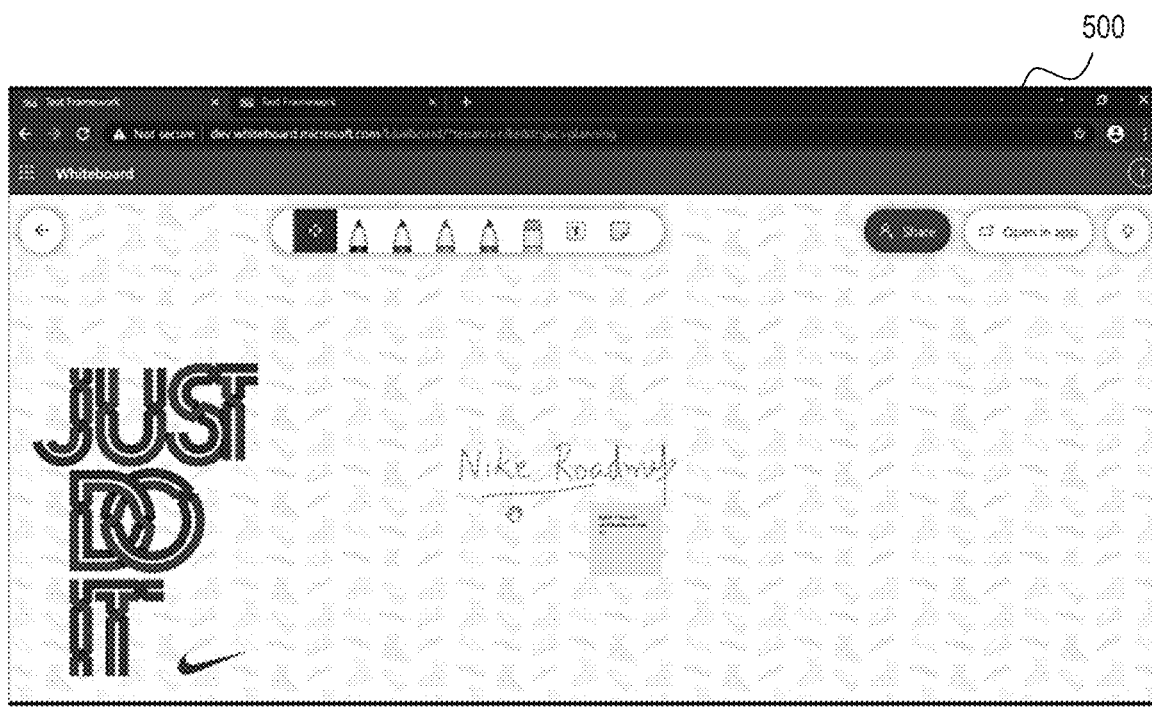

FIG. 5I is an example screenshot of the user interface 500 with the whiteboard canvas zoomed out. In example embodiments, the whiteboard background may be a first layer on the whiteboard canvas and user-generated content (e.g., text, sticky notes) is added on a second layer. Thus, when the host or presenter zooms in or out of the whiteboard canvas, the whiteboard background remains unchanged, but the content will adjust in size with the zooming action. A similar effect can occur with panning actions. For example, if the host moves or "swipes" the content to the left, the whiteboard background remains unmoved.

While example embodiments discuss creating and using customized whiteboard background for a whiteboard session, similar operations can be used to create customized backgrounds for other applications. For example, customized backgrounds can be created for a slide presentation (e.g., a PowerPoint presentation) based on, for example, a title of the slide presentation, a tenant associated with a presenter of the slide presentation, and/or an industry associated with the tenant. In another example, customized backgrounds can be created for a document (e.g., a Word document) based on, for example, a title of the document, a tenant associated with a document author and/or industry associated with the tenant. As with the whiteboard background, any customized background may be created prior to user-generated content being added.

Figure 6:
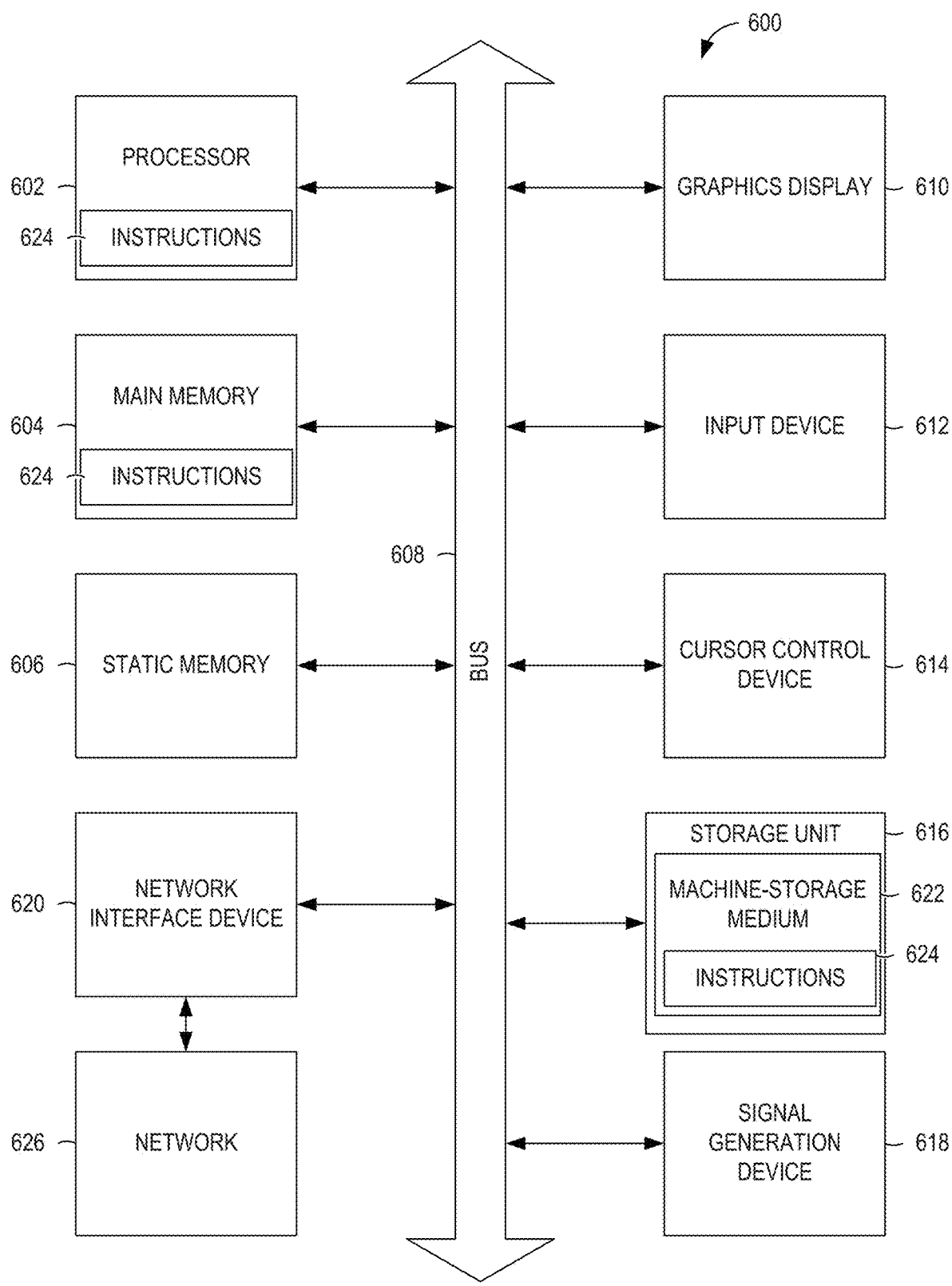
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 to FIG. 4. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for automatically creating customized whiteboard backgrounds. The method comprises accessing, by a network system, metadata associated with a virtual presentation, the metadata including a title associated with the virtual presentation and tenant name associated with the meeting; identifying first image data based on first data of the metadata; identifying second image data based on second data of the metadata; using the first image data and the second image data, generating, by the network system, a plurality of whiteboard backgrounds, the generating comprising combining a first object obtained from the first image data with a second object obtained from the second image data to form each whiteboard background; responsive to generating the plurality of whiteboard backgrounds, causing presentation of a representation of each of the plurality of whiteboard backgrounds on a user interface of a host; receiving, via the user interface, a selection of one of the representations by the host; and in response to receiving the selection, causing a whiteboard background corresponding to the selected representation to be displayed as background on a whiteboard canvas.

In example 2, the subject matter of example 1 can optionally include wherein the first data is the title of the virtual presentation; and the identifying the first image data comprises performing an image search for the first image data based on a topic associated with the title.

In example 3, the subject matter of any of examples 1-2 can optionally include wherein the second data is the tenant name; and the identifying the second image data comprises performing an image search for the second image data based on the tenant name, the second image data comprising one or more logo images.

In example 4, the subject matter of any of examples 1-3 can optionally include wherein the accessing the metadata, identifying the first image data, identifying the second image data, and generating the plurality of whiteboard backgrounds occurs prior to any user-generated content being shared on the whiteboard canvas.

In example 5, the subject matter of any of examples 1-4 can optionally include wherein the generating the plurality of whiteboard backgrounds comprises using object detection to identify the first object in the first image data; removing a background from the first object; applying opacity to the first object; and applying one or more tiles comprising the first object with applied opacity across one of the plurality of whiteboard backgrounds.

In example 6, the subject matter of any of examples 1-5 can optionally include wherein the generating the plurality of whiteboard backgrounds comprises using object detection to identify the second object in the second image data, the second object comprising a logo; removing a background from the second object; and positioning the second object on a corner of one of the plurality of the whiteboard backgrounds.

In example 7, the subject matter of any of examples 1-6 can optionally include wherein the generating the plurality of whiteboard backgrounds comprises determining a dominant color associated with the first object; generating a color palette based on the dominant color; creating a color variation based on the color palette; and using the color variation as a background color.

In example 8, the subject matter of any of examples 1-7 can optionally include wherein the causing the whiteboard background to be displayed comprises displaying the whiteboard background in a preview mode that visually distinguishes the whiteboard background to indicate that the whiteboard background is not confirmed.

Example 9 is a system for automatically creating customized whiteboard backgrounds. The system comprises one or more hardware processors and a memory storing instructions that, when executed by the one or more hardware processors, cause the one or more hardware processors to perform operations accessing metadata associated with a virtual presentation, the metadata including a title associated with the virtual presentation and tenant name associated with the meeting; identifying first image data based on first data of the metadata; identifying second image data based on second data of the metadata; using the first image data and the second image data, generating a plurality of whiteboard backgrounds, the generating comprising combining a first object obtained from the first image data with a second object obtained from the second image data to form each whiteboard background; responsive to generating the plurality of whiteboard backgrounds, causing presentation of a representation of each of the plurality of whiteboard backgrounds on a user interface of a host; receiving, via the user interface, a selection of one of the representations by the host; and in response to receiving the selection, causing a whiteboard background corresponding to the selected representation to be displayed as background on a whiteboard canvas.

In example 10, the subject matter of example 9 can optionally include wherein the first data is the title of the virtual presentation; and the identifying the first image data comprises performing an image search for the first image data based on a topic associated with the title.

In example 11, the subject matter of any of examples 9-10 can optionally include wherein the second data is the tenant name; and the identifying the second image data comprises performing an image search for the second image data based on the tenant name, the second image data comprising one or more logo images.

In example 12, the subject matter of any of examples 9-11 can optionally include wherein the accessing the metadata, identifying the first image data, identifying the second image data, and generating the plurality of whiteboard backgrounds occurs prior to any user-generated content being shared on the whiteboard canvas.

In example 13, the subject matter of any of examples 9-12 can optionally include wherein the generating the plurality of whiteboard backgrounds comprises using object detection to identify the first object in the first image data; removing a background from the first object; applying opacity to the first object; and applying one or more tiles comprising the first object with applied opacity across one of the plurality of whiteboard backgrounds.

In example 14, the subject matter of any of examples 9-13 can optionally include wherein the generating the plurality of whiteboard backgrounds comprises using object detection to identify the second object in the second image data, the second object comprising a logo; removing a background from the second object; and positioning the second object on a corner of one of the plurality of the whiteboard backgrounds.

In example 15, the subject matter of any of examples 9-14 can optionally include wherein the generating the plurality of whiteboard backgrounds comprises determining a dominant color associated with the first object; generating a color palette based on the dominant color; creating a color variation based on the color palette; and using the color variation as a background color.

In example 16 the subject matter of any of examples 9-15 can optionally include wherein the causing the whiteboard background to be displayed comprises displaying the whiteboard background in a preview mode that visually distinguishes the whiteboard background to indicate that the whiteboard background is not confirmed.

Example 17 is a computer-storage medium comprising instructions which, when executed by one or more hardware processors of a machine, cause the machine to perform operations for automatically creating customized whiteboard backgrounds. The operations comprise accessing metadata associated with a virtual presentation, the metadata including a title associated with the virtual presentation and tenant name associated with the meeting; identifying first image data based on first data of the metadata; identifying second image data based on second data of the metadata; using the first image data and the second image data, generating a plurality of whiteboard backgrounds, the generating comprising combining a first object obtained from the first image data with a second object obtained from the second image data to form each whiteboard background; responsive to generating the plurality of whiteboard backgrounds, causing presentation of a representation of each of the plurality of whiteboard backgrounds on a user interface of a host; receiving, via the user interface, a selection of one of the representations by the host; and in response to receiving the selection, causing a whiteboard background corresponding to the selected representation to be displayed as background on a whiteboard canvas.

In example 18, the subject matter of example 17 can optionally include wherein the generating the plurality of whiteboard backgrounds comprises using object detection to identify the first object in the first image data; removing a background from the first object; applying opacity to the first object; and applying one or more tiles comprising the first object with applied opacity across one of the plurality of whiteboard backgrounds.

In example 19, the subject matter of any of examples 17-18 can optionally include wherein the generating the plurality of whiteboard backgrounds comprises using object detection to identify the second object in the second image data, the second object comprising a logo; removing a background from the second object; and positioning the second object on a corner of one of the plurality of the whiteboard backgrounds.

In example 20, the subject matter of any of examples 17-19 can optionally include wherein the generating the plurality of whiteboard backgrounds comprises determining a dominant color associated with the first object; generating a color palette based on the dominant color; creating a color variation based on the color palette; and using the color variation as a background color.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
accessing, by a network system, metadata associated with a virtual presentation, the metadata including a title associated with the virtual presentation and tenant name associated with the meeting;
identifying, by the network system, first image data based on first data of the metadata;
identifying, by the network system, second image data based on second data of the metadata;
using the first image data and the second image data, generating, by the network system, a plurality of whiteboard backgrounds, the generating comprising combining a first object obtained from the first image data with a second object obtained from the second image data to form each whiteboard background:
responsive to generating the plurality of whiteboard backgrounds, causing presentation, by the network system, of a representation of each of the plurality of whiteboard backgrounds on a user interface of a host;
receiving, via the user interface by the network system, a selection of one of the representations by the host; and
in response to receiving the selection, causing, by the network system, a whiteboard background corresponding to the selected representation to be displayed as background on a whiteboard canvas.

2. The method of claim 1, wherein:
the first data is the title of the virtual presentation; and
the identifying the first image data comprises performing an image search for the first image data based on a topic associated with the title.

3. The method of claim 1, wherein:
the second data is the tenant name; and
the identifying the second image data comprises performing an image search for the second image data based on the tenant name, the second image data comprising one or more logo images.

4. The method of claim 1, wherein the accessing the metadata, identifying the first image data, identifying the second image data, and generating the plurality of whiteboard backgrounds occurs prior to any user-generated content being shared on the whiteboard canvas.

5. The method of claim 1, wherein the generating the plurality of whiteboard backgrounds comprises:
using object detection to identify the first object in the first image data;
removing a background from the first object;
applying opacity to the first object; and
applying one or more tiles comprising the first object with applied opacity across one of the plurality of whiteboard backgrounds.

6. The method of claim 1, wherein the generating the plurality of whiteboard backgrounds comprises:
using object detection to identify the second object in the second image data, the second object comprising a logo;
removing a background from the second object; and
positioning the second object on a corner of one of the plurality of the whiteboard backgrounds.

7. The method of claim 1, wherein the generating the plurality of whiteboard backgrounds comprises:
   determining a dominant color associated with the first object;
   generating a color palette based on the dominant color;
   creating a color variation based on the color palette; and
   using the color variation as a background color.

8. The method of claim 1, wherein the causing the whiteboard background to be displayed comprises displaying the whiteboard background in a preview mode that visually distinguishes the whiteboard background to indicate that the whiteboard background is not confirmed.

9. A system comprising:
   one or more hardware processors; and
   a memory storing instructions that, when executed by the one or more hardware processors, cause the one or more hardware processors to perform operations comprising:
      accessing metadata associated with a virtual presentation, the metadata including a title associated with the virtual presentation and tenant name associated with the meeting;
      identifying first image data based on first data of the metadata;
      identifying second image data based on second data of the metadata;
      using the first image data and the second image data, generating a plurality of whiteboard backgrounds, the generating comprising combining a first object obtained from the first image data with a second object obtained from the second image data to form each whiteboard background;
      responsive to generating the plurality of whiteboard backgrounds, causing presentation of a representation of each of the plurality of whiteboard backgrounds on a user interface of a host;
      receiving, via the user interface, a selection of one of the representations by the host; and
      in response to receiving the selection, causing a whiteboard background corresponding to the selected representation to be displayed as background on a whiteboard canvas.

10. The system of claim 9, wherein:
    the first data is the title of the virtual presentation; and
    the identifying the first image data comprises performing an image search for the first image data based on a topic associated with the title.

11. The system of claim 9, wherein:
    the second data is the tenant name; and
    the identifying the second image data comprises performing an image search for the second image data based on the tenant name, the second image data comprising one or more logo images.

12. The system of claim 9, wherein the accessing the metadata, identifying the first image data, identifying the second image data, and generating the plurality of whiteboard backgrounds occurs prior to any user-generated content being shared on the whiteboard canvas.

13. The system of claim 9, wherein the generating the plurality of whiteboard backgrounds comprises:
    using object detection to identify the first object in the first image data;
    removing a background from the first object;
    applying opacity to the first object; and
    applying one or more tiles comprising the first object with applied opacity across one of the plurality of whiteboard backgrounds.

14. The system of claim 9, wherein the generating the plurality of whiteboard backgrounds comprises:
    using object detection to identify the second object in the second image data, the second object comprising a logo;
    removing a background from the second object; and
    positioning the second object on a corner of one of the plurality of the whiteboard backgrounds.

15. The system of claim 9, wherein the generating the plurality of whiteboard backgrounds comprises:
    determining a dominant color associated with the first object;
    generating a color palette based on the dominant color;
    creating a color variation based on the color palette; and
    using the color variation as a background color.

16. The system of claim 9, wherein the causing the whiteboard background to be displayed comprises displaying the whiteboard background in a preview mode that visually distinguishes the whiteboard background to indicate that the whiteboard background is not confirmed.

17. A computer-storage medium comprising instructions which, when executed by one or more hardware processors of a machine, cause the machine to perform operations comprising:
    accessing metadata associated with a virtual presentation, the metadata including a title associated with the virtual presentation and tenant name associated with the meeting;
    identifying first image data based on first data of the metadata;
    identifying second image data based on second data of the metadata;
    using the first image data and the second image data, generating a plurality of whiteboard backgrounds, the generating comprising combining a first object obtained from the first image data with a second object obtained from the second image data to form each whiteboard background;
    responsive to generating the plurality of whiteboard backgrounds, causing presentation of a representation of each of the plurality of whiteboard backgrounds on a user interface of a host;
    receiving, via the user interface, a selection of one of the representations by the host; and
    in response to receiving the selection, causing a whiteboard background corresponding to the selected representation to be displayed as background on a whiteboard canvas.

18. The computer-storage medium of claim 17, wherein the generating the plurality of whiteboard backgrounds comprises:
    using object detection to identify the first object in the first image data;
    removing a background from the first object;
    applying opacity to the first object; and
    applying one or more tiles comprising the first object with applied opacity across one of the plurality of whiteboard backgrounds.

19. The computer-storage medium of claim 17, wherein the generating the plurality of whiteboard backgrounds comprises:
    using object detection to identify the second object in the second image data, the second object comprising a logo;
    removing a background from the second object; and
    positioning the second object on a corner of one of the plurality of the whiteboard backgrounds.

20. The computer-storage medium of claim 17, wherein the generating the plurality of whiteboard backgrounds comprises:
- determining a dominant color associated with the first object;
- generating a color palette based on the dominant color;
- creating a color variation based on the color palette; and
- using the color variation as a background color.

\* \* \* \* \*